US012649817B2

(12) United States Patent
Leedle et al.

(10) Patent No.: US 12,649,817 B2
(45) Date of Patent: Jun. 9, 2026

(54) POLYURETHANE COMPOSITION HAVING AN ADJUSTABLE POT LIFE AND SUITABLE AS A FLOOR COATING

(71) Applicant: SIKA TECHNOLOGY AG, Baar (CH)

(72) Inventors: Linda Leedle, Korntal Münchingen (DE); Christine Salewski, Ilsfeld (DE); Thomas Pusel, Hemmingen (DE); Jochen Grötzinger, Schwäbisch Gmünd (DE); Marina Feile, Murr (DE)

(73) Assignee: SIKA TECHNOLOGY AG, Baar (CH)

( * ) Notice: Subject to any disclaimer, the term of this patent is extended or adjusted under 35 U.S.C. 154(b) by 551 days.

(21) Appl. No.: 18/014,433

(22) PCT Filed: Aug. 25, 2021

(86) PCT No.: PCT/EP2021/073516
§ 371 (c)(1),
(2) Date: Jan. 4, 2023

(87) PCT Pub. No.: WO2022/043383
PCT Pub. Date: Mar. 3, 2022

(65) Prior Publication Data
US 2023/0257506 A1      Aug. 17, 2023

(30) Foreign Application Priority Data

Aug. 27, 2020    (EP) ..................................... 20193104

(51) Int. Cl.
| | |
|---|---|
| *C08G 18/66* | (2006.01) |
| *C08G 18/24* | (2006.01) |
| *C08G 18/36* | (2006.01) |
| *C08G 18/38* | (2006.01) |
| *C08G 18/48* | (2006.01) |
| *C08G 18/79* | (2006.01) |

(52) U.S. Cl.
CPC ....... *C08G 18/6696* (2013.01); *C08G 18/246* (2013.01); *C08G 18/36* (2013.01); *C08G 18/3876* (2013.01); *C08G 18/4829* (2013.01); *C08G 18/792* (2013.01); *C08G 2150/00* (2013.01)

(58) Field of Classification Search
CPC .. C08G 18/246; C08G 18/36; C08G 18/3876; C08G 18/6696; C08G 18/792
See application file for complete search history.

(56) References Cited

U.S. PATENT DOCUMENTS

| | | | |
|---|---|---|---|
| 2008/0119612 A1* | 5/2008 | Scherer ................ | C08G 18/089 525/123 |
| 2012/0130016 A1* | 5/2012 | Argyropoulos .... | C08G 18/4063 524/872 |
| 2019/0106527 A1 | 4/2019 | Haldankar et al. | |
| 2020/0040218 A1* | 2/2020 | Patel ................... | C09D 175/04 |

FOREIGN PATENT DOCUMENTS

| | | |
|---|---|---|
| CN | 110809589 A | 2/2020 |
| EP | 0454219 A1 | 10/1991 |
| WO | 2012/084937 A1 | 6/2012 |
| WO | 2019/002538 A1 | 1/2019 |

OTHER PUBLICATIONS

Jan. 21, 2022 International Search Report issued in International Patent Application No. PCT/EP2021/073516.
Feb. 28, 2023 International Preliminary Report on Patentability issued in International Patent Application No. PCT/EP2021/073516.
Georg Thieme Verlag KG; "Ricinus oil"; Römpp; Dec. 23, 2016; URL:<https://roempp.thieme.de/roempp4.0/do/data/RD-18-01383>.
Georg Thieme Verlag KG; "Ketone resins"; Römpp ; Jul. 2009; URL:<https://roempp.thieme.de/roempp4.0/do/data/RD-11-00959>.

* cited by examiner

*Primary Examiner* — Michael L Leonard
(74) *Attorney, Agent, or Firm* — Oliff PLC

(57) ABSTRACT

A polyurethane composition includes a first component wherein a polyol mixture containing at least one polyol P1 having an average molar mass of 800-30,000 g/mol, the polyol being a polyhydroxy-functional fat and/or oil, or a chemical modification of natural fats and/or oils; preferably at least one polyol selected from the group of polyester polyols and polyether polyols; and a second component wherein at least one aliphatic polyisocyanate I, and at least one filler. The composition includes a tin catalyst for the reaction of hydroxyl and isocyanate groups, forming a thio complexes, and at least one compound including at least one thiol group, wherein the molar ratio of all thiol groups of all metal atoms of the at least one tin catalyst K (T/K) lies between 2.2:1 and 40:1, and the molar ratio of all NCO groups of the at least one tin catalyst K (NCO/K) lies between 50 and 1500.

20 Claims, No Drawings

POLYURETHANE COMPOSITION HAVING AN ADJUSTABLE POT LIFE AND SUITABLE AS A FLOOR COATING

TECHNICAL FIELD

The invention relates to the field of polyurethane compositions and to the use thereof, especially as floor coatings.

PRIOR ART

Two-component polyurethane compositions based on polyols and polyisocyanates have already been used for some time as floor coatings. Two-component polyurethane compositions have the advantage over one-component compositions that they cure rapidly after mixing and can therefore be walked on after a shorter time. Use as floor coatings places high demands on such compositions in respect of strength and adhesive forces.

These should be achieved irrespective of the curing conditions and have both a long pot life and a short curing time. What is desirable would be an open time of 10 min to 5 h and a curing time of 20 min to 6 h under curing conditions with a temperature range of 8° C. to 35° C., especially at 50% relative humidity.

What would be particularly desirable is to adapt the pot life and curing time to the prevailing curing conditions on site and/or to adjust them at will.

For the use of polyurethane compositions as floor coatings, it is generally desirable to be able to combine an adequately long pot life for application to the substrate with subsequent rapid curing and a short wait time until the coating is ready to be worked on further/walked on. This is however barely achievable with today's two-component compositions. Either the pot life is too short in the case of compositions that cure and develop strength rapidly or else curing and the development of strength are slow when working with compositions that have a long pot life.

In other technical fields, two-component polyurethane compositions have been developed that have a long pot life that is even adjustable within certain limits, thus making it possible to work with larger components or production parts too, but that after application also cure very rapidly and exhibit strengths and elasticity, in the sense of structural bonding, within hours to a few days. Such a two-component polyurethane composition in the field of structural adhesives is disclosed in WO 2019/002538 A1. This publication teaches special catalyst systems comprising a metal catalyst and compounds containing thiol groups, which allow an adjustable pot life and subsequent rapid curing of the composition.

In the field of the coatings industry, EP 0454219 discloses a polyurethane composition based on polyacrylic polyols, aliphatic polyisocyanates, a dibutyltin dilaurate catalyst complexed with trimethylolpropane tris(3-mercaptopropionate), and a high proportion of organic solvents.

US 2019/0106527 A1 discloses coatings for vehicles comprising a polyol, preferably polyester polyols or polyacrylate polyols, a polyisocyanate, a catalyst, a tertiary acid, optionally a complexing agent containing at least one —SH group, and a high proportion of organic solvents.

It would therefore be desirable to provide polyurethane compositions for floor coatings that meet the mechanical requirements and, irrespective of the curing conditions, have both a long pot life and a short curing time that can be adjusted as required.

SUMMARY OF THE INVENTION

An object of the present invention is therefore to provide polyurethane compositions for floor coatings that meet the mechanical requirements and, irrespective of the curing conditions, have both a long pot life and a short curing time that can be adjusted as required.

This object is surprisingly achieved with the polyurethane composition of the invention as claimed in claim 1. Further aspects of the invention are the subject of further independent claims. Particularly preferred embodiments of the invention are the subject of the dependent claims.

WAYS OF EXECUTING THE INVENTION

The present invention relates to a polyurethane composition comprising a first component A and a second component B, wherein the first component A comprises
  a polyol mixture P, comprising
    at least one polyol P1 having an average molecular weight of 800 to 30 000 g/mol, preferably 850 to 20 000 g/mol, more preferably 900 to 10 000 g/mol, wherein the polyol P1 is a polyhydroxy-functional fat and/or a polyhydroxy-functional oil, or a polyol obtained by chemically modifying natural fats and/or natural oils; and
    preferably at least one polyol P2 selected from the group consisting of polyester polyols and polyether polyols; and
the second component B comprises
  at least one aliphatic polyisocyanate I;
wherein the polyurethane composition additionally contains 5% by weight to 70% by weight of at least one filler F, based on the total weight of the polyurethane composition, and at least one tin catalyst K for the reaction of hydroxyl groups and isocyanate groups that is capable of forming thio complexes, and at least one compound T having at least one thiol group, the molar ratio of all thiol groups in the at least one compound T to all metal atoms in the at least one tin catalyst K (T/K) being from 2.2:1 to 40:1 and the molar ratio of all NCO groups in the polyurethane composition to all metal atoms in the at least one tin catalyst K (NCO/K) being from 50 to 1500.

The prefix "poly" in substance names such as "polyol", "polyisocyanate", "polyether" or "polyamine" in the present document indicates that the respective substance formally contains more than one of the functional group that occurs in its name per molecule.

The term "polymer" in the present document encompasses firstly a collective of macromolecules that are chemically uniform but differ in the degree of polymerization, molar mass, and chain length, said collective having been produced by a "poly" reaction (polymerization, polyaddition, polycondensation). The term secondly also encompasses derivatives of such a collective of macromolecules from "poly" reactions, i.e. compounds obtained by reactions, for example additions or substitutions, of functional groups on defined macromolecules and that may be chemically uniform or chemically nonuniform. The term further encompasses so-called prepolymers too, i.e. reactive oligomeric initial adducts, the functional groups of which are involved in the formation of macromolecules.

"Molecular weight" is in the present document understood as meaning the molar mass (in grams per mole) of a molecule or a molecule residue. "Average molecular weight" refers to the number-average $M_n$ of a polydisperse mixture of oligomeric or polymeric molecules or molecule residues, which is normally determined by gel-permeation chromatography (GPC) against polystyrene as standard.

Percent by weight values, abbreviated to % by weight, refer to the proportions by mass of a constituent in a composition based on the overall composition, unless otherwise stated. The terms "mass" and "weight" are used synonymously in the present document.

A "primary hydroxyl group" refers to an OH group attached to a carbon atom having two hydrogens.

"Pot life" refers in this document to the time within which, after mixing the components, the polyurethane composition can be worked with before the viscosity resulting from the progression of the crosslinking reaction has become too high for further processing.

"Curing time" refers in this document to the time needed to ensure adequate hardness of the polyurethane composition, especially in respect of it being ready to be worked on further/walked on.

The term "strength" in the present document refers to the strength of the cured composition, strength meaning in particular the tensile strength and modulus of elasticity, particularly in the 0.05% to 0.25% elongation range or in the 0.5 to 5.0% range.

"Room temperature" in the present document refers to a temperature of 23° C. A substance or a composition is described as "storage-stable" or "storable" if it can be stored at room temperature in a suitable container for a relatively long period, typically at least 3 months up to 6 months or longer, without this storage resulting in any change in its application properties or use properties, especially in the viscosity and crosslinking rate, to an extent relevant to its use.

All industry standards and norms mentioned in this document relate to the versions valid at the date of first filing.

The "average OH functionality" is the number of OH groups per polymer molecule, averaged over all polymer molecules. If, for example, 50% of all polymer molecules contain two hydroxyl groups and the other 50% contain three, the result is an average OH functionality of 2.5. The average OH functionality can in particular be determined by calculation from the hydroxyl value and the molecular weight $M_n$ determined via GPC.

The polyurethane composition of the invention comprises a first component A and a second component B, which are mixed only on application of the polyurethane composition and are stored prior to this in separate packages.

The first component A comprises a polyol mixture P.

Preferably, the proportion of the polyol mixture P is from 5% by weight to 90% by weight, preferably 10% by weight to 80% by weight, 20% by weight to 70% by weight, 30% by weight to 60% by weight, especially 40% by weight to 50% by weight, based on component A.

It can also be advantageous when the proportion of the polyol mixture P is from 5% by weight to 70% by weight, preferably 10% by weight to 60% by weight, 15% by weight to 50% by weight, 20% by weight to 45% by weight, especially 30% by weight to 40% by weight, based on the total weight of the polyurethane composition.

The polyol mixture P comprises at least one polyol P1 having an average molecular weight of 800 to 30 000 g/mol, preferably 850 to 20 000 g/mol, more preferably 900 to 10 000 g/mol, wherein the polyol P1 is a polyhydroxy-functional fat and/or a polyhydroxy-functional oil or a polyol obtained by chemically modifying natural fats and/or natural oils.

Examples of chemically modified natural fats and/or oils are polyols obtained from epoxy polyesters or epoxy polyethers, which are obtained for example by epoxidation of unsaturated oils, by subsequent ring opening with carboxylic acids or alcohols, polyols obtained by hydroformylation and hydrogenation of unsaturated oils, or polyols obtained from natural fats and/or oils by degradation processes such as alcoholysis or ozonolysis and subsequent chemical linkage of the degradation products thus obtained or derivatives thereof, for example by transesterification or dimerization. Also suitable are polyols obtained by polyoxyalkylation of natural oils such as castor oil and available for example under the Lupranol Balance® trade name from Elastogran GmbH. Suitable breakdown products of natural fats and/or oils are in particular fatty acids and fatty alcohols and fatty acid esters, in particular the methyl esters (FAME), which can be derivatized to hydroxy fatty acid esters, for example by hydroformylation and hydrogenation.

The polyols P1 mentioned above usually have a relatively high average molecular weight of between 800 and 30 000 g/mol, preferably between 850 and 20 000 g/mol, more preferably between 900 and 10 000 g/mol, and preferably an average OH functionality within a range of from 1.6 to 3.

Preferably the polyol P1 is castor oil or a chemical modification thereof, especially a chemical modification of castor oil, most preferably a reaction product of castor oil with ketone resins.

Particularly preferably, the polyol P1 is a polyol having an OH value of 110 to 200 mg KOH/g. The OH value is preferably from 140 to 190 mg, especially 140 to 170 mg, more preferably 150 to 170 mg KOH/g.

Particular preference is given to reaction products of castor oil with cyclohexanone-based ketone resins, especially those sold for example by Nuplex Resins GmbH, Germany under the names Setathane® 1150, Setathane® 1155, and Setathane® 1160.

In the present document, the term "castor oil" is preferably understood as meaning castor oil as described in the online Römpp Chemie Lexikon (Thieme Verlag), retrieved on 23.12.2016.

In the present document, the term "ketone resin" is preferably understood as meaning ketone resin as described in the online Römpp Chemie Lexikon, Thieme Verlag, retrieved on 23.12.2016.

The polyol mixture P preferably comprises at least one polyol P2 selected from the group consisting of polyester polyols and polyether polyols.

The polyol P2 has in all embodiments preferably an average molecular weight within a range of from 400 to 6000 g/mol, especially 450 to 5500 g/mol, more preferably 500 to 5000 g/mol, 750 to 3000 g/mol, most preferably 1000 to 2000 g/mol.

The polyol P2 has in all embodiments preferably an average OH functionality within a range of from 2 to 4, especially 2 to 3.5, more preferably 2 to 3.

The polyol P2 has in all embodiments preferably an OH value within a range of from 20 to 600 mg KOH/g, 50 to 600 mg KOH/g, 100 to 600 mg KOH/g, especially 200 to 600 mg KOH/g, 300 to 600 mg KOH/g, more preferably 350 to 600 mg KOH/g.

Polyether polyols, also termed polyoxyalkylene polyols or oligoetherols, suitable as polymer P2 are in particular those that are polymerization products of ethylene oxide, 1,2-propylene oxide, 1,2- or 2,3-butylene oxide, oxetane, or mixtures thereof, optionally polymerized with the aid of a starter molecule having two or more active hydrogen atoms such as water, ammonia or compounds having a plurality of OH or NH groups, for example ethane-1,2-diol, propane-1, 2-diol and -1,3-diol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, cyclohexane-1,3-dimethanol and -1,4-dimethanol, bisphenol A, hydrogenated bisphenol A, 1,1,1-trimethylolethane, 1,1,1-trimethylolpropane, glycerol, aniline, and also mixtures of the recited compounds. It is possible to use both polyoxyalkylene polyols having a low degree of unsaturation (measured in accordance with ASTM D-2849-69 and expressed in milliequivalents of unsaturation per gram of polyol (mEq/g)), produced for example using so-called double metal cyanide complex catalysts (DMC catalysts), and polyoxyalkylene polyols having a higher degree of unsaturation, produced for example using anionic catalysts such as NaOH, KOH, CsOH or alkali metal alkoxides.

Particularly suitable as polyol P2 are polyoxyethylene polyols and polyoxypropylene polyols, especially polyoxyethylene diols, polyoxypropylene diols, polyoxyethylene triols, and polyoxypropylene triols.

Especially suitable as polyol P2 are polyoxyalkylene diols or polyoxyalkylene triols having a degree of unsaturation lower than 0.02 mEq/g and having a molecular weight within a range of from 1000 to 15 000 g/mol, as are polyoxyethylene diols, polyoxyethylene triols, polyoxypropylene diols, and polyoxypropylene triols having a molecular weight of 400 to 15 000 g/mol.

Likewise particularly suitable as polyol P2 are what are known as ethylene oxide-terminated ("EO-endcapped", ethylene oxide-endcapped) polyoxypropylene polyols. The latter are special polyoxypropylene polyoxyethylene polyols that are obtained for example when pure polyoxypropylene polyols, especially polyoxypropylene diols and triols, are at the end of the polypropoxylation reaction further alkoxylated with ethylene oxide and thus have primary hydroxyl groups. Preference in this case is given to polyoxypropylene polyoxyethylene diols and polyoxypropylene polyoxyethylene triols.

Suitable polyether-based polymers P2 of this kind are available for example under the Acclaim® and Desmophen® trade names from Covestro, especially Acclaim® 4200, Desmophen® 5034, Desmophen® 1381 BT, and Desmophen® 28HS98, under the Voranol® trade name from Dow, especially Voranol® EP 1900 and Voranol® CP 4755, and under the under the Dianol® trade name from Arkema, especially Dianol® 3130 HP.

Suitable polyester polyols include in particular polyesters that bear at least two hydroxyl groups and are produced by known processes, especially polycondensation of hydroxycarboxylic acids or polycondensation of aliphatic and/or aromatic polycarboxylic acids with dihydric or polyhydric alcohols.

Especially suitable are polyester polyols produced from dihydric to trihydric alcohols, for example ethane-1,2-diol, diethylene glycol, propane-1,2-diol, dipropylene glycol, or mixtures of the abovementioned alcohols with organic dicarboxylic acids or the anhydrides or esters thereof, for example succinic acid, glutaric acid, adipic acid, trimethyladipic acid, maleic acid, fumaric acid, phthalic acid, phthalic anhydride, isophthalic acid, terephthalic acid, dimethyl terephthalate, hexahydrophthalic acid, trimellitic acid and trimellitic anhydride or mixtures of the abovementioned acids, as are polyester polyols formed from lactones such as ε-caprolactone.

Particularly suitable are hydrophilic polyester diols, especially those produced from adipic acid, phthalic acid, isophthalic acid, and terephthalic acid as the dicarboxylic acid or from lactones such as ε-caprolactone and from ethylene glycol, diethylene glycol, neopentyl glycol, butane-1,4-diol, hexane-1,6-diol, and cyclohexane-1,4-dimethanol as the dihydric alcohol.

Examples of suitable polyester polyols are those obtainable under the Kuraray® trade name from Kuraray, especially Kuraray® F-510, and those obtainable under the K-Flex® trade name from King Industries, especially K-Flex® 188.

Particularly suitable polyols P2 are polyether polyols, selected in particular from the list consisting of polyoxyethylene polyol, polyoxypropylene polyol, and polyoxypropylene polyoxyethylene polyol, preferably polyoxyethylene diol, polyoxypropylene diol, polyoxyethylene triol, polyoxypropylene triol, polyoxypropylene polyoxyethylene diol, and polyoxypropylene polyoxyethylene triol, most preferably polyoxypropylene triol.

Most preferably, polyol P2 is a polyether polyol, especially a polyether polyol having an average OH functionality of at least 2.5, and preferably having propylene glycol repeat units in the polymer backbone.

Preferably the weight ratio of polyol P1 to polyol P2 ((P1)/(P2)) is from 1.25 to 2.5, preferably 1.5 to 2.25, most preferably 1.75 to 2.0. A ratio of less than 1.25 results in lower elongation values, a ratio of more than 2.5 results in lower mechanical properties and toughness.

Preferably, the sum total of polyol P1 and polyol P2 is more than 75% by weight, preferably than 80% by weight, than 90% by weight, than 95% by weight, especially than 98% by weight, of the polyol mixture P.

The polyol mixture P preferably comprises more than 80% by weight, more than 90% by weight, more than 95% by weight, especially more than 98% by weight, of the total amount of NCO-reactive groups in the polyurethane composition.

The second component B comprises at least one aliphatic polyisocyanate I.

An "aliphatic isocyanate" refers to an isocyanate in which the isocyanate groups are directly attached to an aliphatic carbon atom. Such isocyanate groups are accordingly referred to as "aliphatic isocyanate groups".

Suitable aliphatic polyisocyanates I are in particular monomeric di- or triisocyanates and also oligomers, polymers, and derivatives of monomeric di- or triisocyanates, and any desired mixtures thereof.

Preferred aliphatic monomeric polyisocyanates are aliphatic or cycloaliphatic diisocyanates, especially HDI, TMDI, cyclohexane 1,3-diisocyanate or 1,4-diisocyanate, IPDI, $H_{12}MDI$, 1,3- or 1,4-bis(isocyanatomethyl)cyclohexane, and XDI.

A particularly preferred monomeric polyisocyanate is HDI, IPDI, TDI or $H_{12}MDI$. Most preferred is HDI or IPDI, especially HDI.

Suitable oligomers, polymers, and derivatives of the monomeric di- and triisocyanates mentioned are especially those derived from HDI or IPDI, especially HDI. Among these, commercially available products are especially suitable, for example Desmodur® N 75, Desmodur® N 3600, and Desmodur® N 3900 (all from Covestro). They preferably have an NCO content of 16% to 24% by weight, preferably 20% to 24% by weight.

Particularly preferred aliphatic polyisocyanates are oligomers, polymers, and derivatives derived from HDI or IPDI, especially HDI. They preferably have an NCO content of 16% to 24% by weight, preferably 20% to 24% by weight.

It is further advantageous when the sum of the NCO groups that do not originate from aliphatic polyisocyanate I is ≤20%, especially ≤10%, especially preferably ≤5%, most preferably ≤1%, based on the sum of all NCO groups in the polyurethane composition.

The proportion of the aliphatic polyisocyanate I is preferably ≥90% by weight, especially ≥95% by weight, especially preferably ≥99% by weight, based on the total weight of the second component.

Preferably, the polyurethane composition has a proportion of aromatic polyisocyanates of less than 5% by weight, less than 2% by weight, less than 1% by weight, less than 0.5% by weight, less than 0.1% by weight, based on the total weight of the polyurethane composition. Aromatic polyisocyanates are disadvantageous in that the pot life is greatly reduced and the cured polyurethane composition tends to undergo yellowing.

Preferably, the polyurethane composition has a proportion of polyaspartic esters of less than 15% by weight, of less than 10% by weight, of less than 5% by weight, less than 2% by weight, less than 1% by weight, less than 0.5% by weight, less than 0.1% by weight, based on the total weight of the polyurethane composition. Polyaspartic esters are disadvantageous in that the curing reaction proceeds too quickly, especially at high humidity.

The weight ratio of component (A) to component (B) is preferably 5:1 to 2:1, more preferably 4:1 to 3:1.

The molar ratio between free NCO groups and NCO-reactive groups, preferably OH groups, in the composition according to the invention is before mixing preferably between 0.8-1.2, preferably 0.9-1.1, especially 0.95-1.05.

The polyurethane composition additionally contains 5% by weight to 70% by weight of at least one filler F, based on the total weight of the polyurethane composition. The filler F may be present in the first component A or in the second component B, more particularly it is present in the first component A.

Fillers are preferably selected from the list consisting of ground or precipitated calcium carbonates that have optionally been coated with fatty acids, especially stearates, barytes, quartz powders, quartz sands, dolomites, wollastonites, kaolins, calcined kaolins, phyllosilicates, such as mica or talc, zeolites, aluminum hydroxides, magnesium hydroxides, silicas, including finely divided silicas from pyrolysis processes, cements, gypsums, fly ashes, industrially produced carbon blacks, graphite, metal powders, for example of aluminum, copper, iron, silver or steel, PVC powders or hollow beads.

The polyurethane composition preferably comprises at least one filler F selected from the group consisting of calcium carbonate, carbon black, quartz sand, kaolin, baryte, talc, quartz powder, dolomite, wollastonite, kaolin, calcined kaolin, and mica. Particularly preferred fillers are fillers F selected from the list consisting of ground calcium carbonates, calcined kaolins, quartz sands or baryte.

It may be advantageous to use a mixture of different fillers. Most preferred are combinations of ground calcium carbonates or calcined kaolins and baryte.

The particle size of the fillers F is preferably 0.1 to 50 μm, more preferably 1 to 30 μm.

The proportion of fillers F is preferably 10-55% by weight, 15-50% by weight, 20-50% by weight, 25-45% by weight, especially 30-40% by weight, based on the total weight of the polyurethane composition.

The polyurethane composition additionally comprises at least one tin catalyst K for the reaction of hydroxyl groups and isocyanate groups that is capable of forming thio complexes.

It can be seen from Table 6 that, when a bismuth catalyst is used, a film that has cured sufficiently for Shore A to be measurable is still absent even after a curing time of 6 h; the film present being instead still liquid and tacky on its surface.

The tin catalyst K is preferably an organotin compound, especially an organotin(IV) compound.

In particular, it is a tin catalyst K selected from the list consisting of dibutyltin diacetate, dibutyltin dilaurate, dibutyltin dichloride, dibutyltin diacetylacetonate, dimethyltin dilaurate, dioctyltin diacetate, dioctyltin dilaurate, dioctyltin diacetylacetonate, bis[(2-ethyl-1-oxohexyl)oxy] dioctylstannane, bis(neodecanoyloxy)dioctylstannane, bis(dodecylthio)dioctylstannane, and bis(dodecylthio)dimethylstannane.

In particular, it is dibutyltin dilaurate, dioctyltin diacetylacetonate, or bis(dodecylthio)dioctylstannane, particularly preferably dibutyltin dilaurate.

It may be advantageous if the tin catalyst K is present only in the first component A.

Particularly preferably, the tin catalyst K is present only in a third component C that is not the first component A or the second component B. This has the advantage of achieving better storage stability and that the pot life and curing time can be flexibly adapted to the curing conditions.

The amount of tin catalyst K, based on the overall polyurethane composition, is preferably within a range of from 0.04% to 0.75% by weight, preferably 0.07% to 0.3% by weight, especially 0.08% to 0.6% by weight, more preferably 0.1% to 0.25% by weight, based on the overall polyurethane composition.

Preferably, the polyurethane composition has a proportion of less than 0.5% by weight, less than 0.1% by weight, less than 0.05% by weight, less than 0.01% by weight, less than 0.001% by weight, based on the total weight of the polyurethane composition, of catalysts for the reaction of hydroxyl groups and isocyanate groups that are not the tin catalysts K mentioned above. In particular, these are metal catalysts, especially bismuth, zinc or zirconium compounds, including complexes and salts of these metals, preferably complex compounds of bismuth (III) or zirconium (IV), especially with ligands selected from alkoxides, carboxylates, 1,3-diketonates, oxinate, 1,3-ketoesterates, and 1,3-ketoamidates, or compounds containing tertiary amino groups, such as in particular 2,2'-dimorpholinodiethyl ether (DMDEE).

The polyurethane composition additionally comprises at least one compound T that has at least one thiol group. A thiol group is understood here as meaning an —SH group that is attached to an organic radical, for example an aliphatic, cycloaliphatic or aromatic carbon radical.

Preference is given to compounds having 1 to 6, especially 2 to 4, most preferably 2 or 3, thiol groups.

Examples of suitable compounds T having a thiol group are 3-mercaptopropyltrimethoxysilane, 3-mercaptopropyltriethoxysilane, 3-mercaptopropane-1,2-diol, 2-mercaptotoluimidazole or 2-mercaptobenzothiazole.

Suitable compounds T having more than one thiol group are preferably selected from the list consisting of ethylene glycol di(3-mercaptopropionate), ethylene glycol dimercaptoacetate, dipentaerythritol hexa(3-mercaptopropionate), trimethylolpropane tris(3-mercaptopropionate), 2,3-dimercapto-1,3,4-thiadiazole, pentaerythritol tetrakis(3-mer-captopropionate), and 3,6-dioxa-1,8-octanedithiol.

The compound T is preferably selected from the group consisting of ethylene glycol di(3-mercaptopropionate), ethylene glycol dimercaptoacetate, and dipentaerythritol hexa (3-mercaptopropionate), most preferably ethylene glycol di(3-mercaptopropionate).

It can be seen from Table 7 that very similar pot lives can be obtained when using 2-, 3- and 4-functional compounds T at comparable molar ratios (T/K).

The amount of compound T, based on the overall polyurethane composition, is preferably within a range of from 0.075% to 0.9% by weight, preferably 0.11% to 0.75% by weight, preferably 0.11% to 0.6% by weight, preferably 0.11% to 0.45% by weight, preferably 0.11% to 0.35% by weight, especially 0.15% to 0.3% by weight, based on the total polyurethane composition.

Compounds having at least one thiol group that are optionally present as ligands of the tin catalyst K, for example dodecylthiol in bis(dodecylthio)dioctylstannane, are counted towards the total amount of compound T in the polyurethane composition.

Preferably, the compound T is present only in a third component C. The third component C is preferably the abovementioned component C comprising the mentioned tin catalyst K.

This has the advantage of achieving better storage stability and that the pot life and curing time can be flexibly adapted to the curing conditions.

Most preferably, the compound T and the tin catalyst K are present only in a third component C.

The molar ratio of all thiol groups in the at least one compound T to all metal atoms in the at least one tin catalyst K (T/K) is from 2.2:1 to 40:1.

The molar ratio (T/K) is preferably 2.5:1 to 30:1, especially 3:1 to 20:1, 3:1 to 18:1, 3:1 to 16:1, 3:1 to 15:1, 3:1 to 12:1, 4:1 to 10:1, most preferably 5:1 to 9:1.

This is advantageous in that polyurethane compositions are obtained that have both a long pot life and a short curing time, particularly under curing conditions with a temperature range of 8° C. to 35° C. at 50% relative humidity, especially of 12° C. to 23° C. at 50% relative humidity. This can be seen for example in Tables 3-5, where pot lives of 30-50 min with curing times of 1.5-3.0 h are obtained.

A molar ratio of greater than 40:1 is disadvantageous in that it results in polyurethane compositions being obtained that, especially when cured at 23° C. and 50% relative humidity, have curing times of more than 6 h, tend to have surfaces that remain tacky for a long time, and show uneven hardening behavior through the applied layer. This can be seen for example in Table 4 with reference to composition E11.

A molar ratio of less than 2.2:1 is disadvantageous in that it results in polyurethane compositions having too short a pot life. This can be seen for example in Table 4 with reference to composition E12.

The molar ratio of all NCO groups in the polyurethane composition to all metal atoms in the at least one tin catalyst K (NCO/K) is from 50 to 1500.

More particularly, the molar ratio (NCO/K) is 100 to 1300, preferably 125 to 1200, 200 to 1150, 250 to 1000, 300 to 800, most preferably 400 to 700.

This is advantageous in that polyurethane compositions are obtained that have both a long pot life and a short curing time, particularly under curing conditions with a temperature range of 8° C. to 35° C. at 50% relative humidity, especially of 12° C. to 23° C. at 50% relative humidity. This can be seen for example in Tables 3-5, where pot lives of 30-50 min with curing times of 1.5-3.0 h are obtained.

A preferred combination of (T/K) with (NCO/K) is (T/K): 2.5-20, especially 2.5-15, 2.5-10, 2.5-8, 3-7, 3.5-6, 3.5-5, preferably 3.5-4.5. (NCO/K): 100-800, 125-700, 150-600, 200-500, especially 250-400 Such a polyurethane composition is advantageous in that long pot lives and short curing times can be obtained at 12° C./50% relative humidity.

Another preferred combination of (T/K) with (NCO/K) is (T/K): 2.5-25, especially 3-20, 3-15, 3-12, 3-10, 3.5-8, 4-7, 4.5-6, preferably 5-6. (NCO/K): 200-800, 300-700, 350-600, 400-550, especially 450-550 Such a polyurethane composition is advantageous in that long pot lives and short curing times can be obtained at 18° C./50% relative humidity.

Further preferred is a combination of (T/K) with (NCO/K) of (T/K): 3-30, especially 4-25, 4-20, 5-15, 6-12, 7-12, preferably 7-10. (NCO/K): 200-1200, 300-1000, 400-800, 500-700, especially 550-650 Such a polyurethane composition is advantageous in that long pot lives and short curing times can be obtained at 23° C./50% relative humidity.

Further preferred is a combination of (T/K) with (NCO/K) of (T/K): 10-40, especially 10-30, 12-25, 12-20, 12-18, 14-18, preferably 15-17. (NCO/K): 500-1500, 800-1300, 1000-1300, 1100-1300, especially 1150-1250 Such a polyurethane composition is advantageous in that long pot lives and short curing times can be obtained at 35° C./50% relative humidity.

Preferably, the polyurethane composition has a proportion of organic solvents, especially organic solvents having a boiling point at 23° C. of less than 200° C., of less than 5% by weight, less than 2% by weight, less than 1% by weight, less than 0.5% by weight, less than 0.1% by weight, based on the total weight of the polyurethane corn position.

Said organic solvents are especially organic solvents selected from the list consisting of acetone, methyl ethyl ketone, methyl n-propyl ketone, diisobutyl ketone, methyl isobutyl ketone, methyl n-amyl ketone, methyl isoamyl ketone, acetylacetone, mesityl oxide, cyclohexanone, methylcyclohexanone, ethyl acetate, propyl acetate, butyl acetate, n-butyl propionate, diethyl malonate, 1-methoxy-2-propyl acetate, ethyl 3-ethoxypropionate, diisopropyl ether, diethyl ether, dibutyl ether, diethylene glycol diethyl ether, ethylene glycol diethyl ether, ethylene glycol monopropyl ether, ethylene glycol mono(2-ethylhexyl) ether, acetals such as in particular methylal, ethylal, propylal, butylal, 2-ethylhexylal, dioxolane, glycerol formal or 2,5,7,10-tetraoxaundecane (TOU), toluene, xylene, heptane, octane, naphtha, white spirit, petroleum ether or petroleum spirit, methylene chloride, propylene carbonate, butyrolactone, N-methylpyrrolidone, and N-ethylpyrrolidone.

Preferably, the polyurethane composition also has a proportion of plasticizer of 1-10% by weight, 2-8% by weight, 3-6% by weight, especially 3-5% by weight, based on the total weight of the polyurethane composition.

Such plasticizers are selected in particular from the list consisting of carboxylic esters such as phthalates, especially diisononyl phthalate (DINP), diisodecyl phthalate (DIDP) or di(2-propylheptyl) phthalate (DPHP), hydrogenated phthalates, especially hydrogenated diisononyl phthalate or diisononyl cyclohexane-1,2-dicarboxylate (DINCH), terephthalates, especially dioctyl terephthalate, trimellitates, adipates, especially dioctyl adipate, azelates, sebacates, benzoates, glycol ethers, glycol esters, organic phosphoric or sulfonic acid esters, polybutenes, and polyisobutenes.

It can also be advantageous when the polyurethane composition has a proportion of the abovementioned plasticizers of less than 5% by weight, of less than 2% by weight, less than 1% by weight, less than 0.5% by weight, less than 0.1% by weight, based on the total weight of the polyurethane composition.

The composition may comprise further additives commonly used for polyurethane compositions. More particularly, the following auxiliaries and additives may be present:

inorganic or organic pigments, especially titanium dioxide, chromium oxides or iron oxides;

fibers;

adhesion promoters;

rheology modifiers;

flame-retardant substances;

additives, especially wetting agents, leveling agents, defoamers, deaerators, stabilizers against oxidation, heat, light or UV radiation, or biocides;

or further substances customarily used in such compositions.

The polyurethane composition contains preferably less than 0.5% by weight, especially less than 0.1% by weight, based on the overall composition, of carboxylic acids. Any carboxylate ligands introduced through the metal catalyst are not included here among said carboxylic acids. Compounds having carboxylic acid groups optionally present in the polyol P1 are likewise not included here among said carboxylic acids.

The polyurethane composition contains preferably less than 0.5% by weight, especially less than 0.1% by weight, less than 0.01% by weight, more preferably less than 0.001% by weight, based on the overall composition, of a tertiary acid of formula RR'R''CCOOH, where each R, R', and R'' group is independently an alkyl, alkenyl, aryl or aralkyl group containing at least one carbon atom, with the proviso that two or three of the R, R' and R'' groups may be connected to form a ring structure, and where the groups R, R', and/or R'' may be substituted and where the total number of carbon atoms in the groups R, R' and R'' is within a range of from 3 to 40.

A preferred polyurethane composition comprises a first component A and a second component B, wherein the first component A comprises a polyol mixture P, comprising at least one polyol P1 having an average molecular weight of 800 to 30 000 g/mol, preferably 850 to 20 000 g/mol, more preferably 900 to 10 000 g/mol, wherein the polyol P1 is castor oil or a chemical modification thereof, especially a chemical modification of castor oil, more preferably a reaction product of castor oil with ketone resins, preferably a polyol having an OH value of 110 to 200 mg KOH/g, 140 to 190 mg KOH/g, especially 140 to 170 mg KOH/g, more preferably 150 to 170 mg KOH/g; and preferably at least one polyol P2 selected from the group consisting of polyester polyols and polyether polyols, preferably polyether polyols, especially preferably polyoxyethylene polyols, polyoxypropylene polyols, and polyoxypropylene polyoxyethylene polyols, especially polyols having an average molecular weight within a range of from 400 to 6000 g/mol, especially 450 to 5500 g/mol, more preferably 500 to 5000 g/mol, 750 to 3000 g/mol, most preferably 1000 to 2000 g/mol, preferably polyols having an average OH functionality within a range of from 2 to 4, especially 2 to 3.5, more preferably 2 to 3;

wherein the weight ratio of polyol P1 to polyol P2 ((P1)/(P2)) is preferably from 1.25 to 2.5, preferably 1.5 to 2.25, most preferably 1.75 to 2.0; and the second component B comprises at least one aliphatic polyisocyanate I, especially oligomers, polymers, and derivatives derived from HDI or IPDI, especially HDI, especially having an NCO content of from 16% to 24% by weight, preferably 20% to 24% by weight.

The preferred polyurethane composition further comprises:

5% by weight to 70% by weight, 10-55% by weight, 15-50% by weight, 20-50% by weight, 25-45% by weight, especially 30-40% by weight, of at least one filler F, based on the total weight of the polyurethane composition, selected in particular from the group consisting of calcium carbonate, carbon black, quartz sand, kaolin, baryte, talc, quartz powder, dolomite, wollastonite, kaolin, calcined kaolin, and mica; and at least one tin catalyst K for the reaction of hydroxyl groups and isocyanate groups that is capable of forming thio complexes, especially an organotin compound, especially an organotin(IV) compound; and at least one compound T having at least one thiol group, especially 2 to 4, most preferably 2 or 3, thiol groups, selected in particular from the list consisting of ethylene glycol di(3-mercaptopropionate), ethylene glycol dimercaptoacetate, dipentaerythritol hexa(3-mercaptopropionate), trimethylolpropane tris(3-mercaptopropionate), 2,3-dimercapto-1,3,4-thiadiazole, pentaerythritol tetrakis(3-mercaptopropionate), and 3,6-dioxa-1,8-octanedithiol; and the molar ratio of all thiol groups in the at least one compound T to all metal atoms in the at least one tin catalyst K (T/K) is from 2.2:1 to 40:1, especially 3:1 to 20:1, 3:1 to 18:1, 3:1 to 16:1, 3:1 to 15:1, 3:1 to 12:1 , 4:1 to 10:1, most preferably 5:1 to 9:1; and the molar ratio of all NCO groups in the polyurethane composition to all metal atoms in the at least one tin catalyst K (NCO/K) is from 50 to 1500, 100 to 1300, preferably 125 to 1200, 200 to 1150, 250 to 1000, 300 to 800, most preferably 400 to 700.

The molar ratio between free NCO groups and NCO-reactive groups, preferably OH groups, in the preferred composition is before mixing preferably between 0.8-1.2, preferably 0.9-1.1, especially 0.95-1.05.

Preferably, the preferred polyurethane composition has a proportion of organic solvents, especially organic solvents having a boiling point at 23° C. of less than 200° C., of less than 5% by weight, less than 2% by weight, less than 1% A by weight, less than 0.5% by weight, less than 0.1% by weight.

Preferably, the sum total of polyol P1 and polyol P2 in the preferred polyurethane composition is more than 75% by weight, preferably than 80% by weight, than 90% by weight, than 95% by weight, especially than 98% by weight, of the polyol mixture P.

The polyol mixture P preferably comprises more than 80% by weight, more than 90% by weight, more than 95% by weight, especially more than 98% by weight, of the total amount of NCO-reactive groups in the preferred polyurethane composition.

The proportion of the aliphatic polyisocyanate I in the preferred polyurethane composition is preferably ≥90% by weight, especially ≥95% by weight, especially preferably ≥99% by weight, based on the total weight of the second component.

Particularly preferably, the tin catalyst K is in the preferred polyurethane composition present only in a third component C that is not the first component A or the second component B.

The two components A and B are produced separately and preferably with the exclusion of moisture. The two components are typically each stored in a separate container. The further constituents of the polyurethane composition may be present as a constituent of the first or second component, further constituents that are reactive toward isocyanate groups preferably being a constituent of the first component. A suitable container for storing the respective component is especially a drum, a hobbock, a bag, a bucket, a can, a cartridge or a tube. The components are both storage-stable, meaning that they can be stored prior to use for several months up to one year or longer without any change in their respective properties to a degree relevant to their use.

The two components are stored separately prior to the mixing of the composition and are not mixed with one another until use or just before use. They are advantageously present in a package consisting of two separate chambers.

In further aspect, the invention comprises a pack containing the polyurethane composition according to the invention, consisting of a package having at least two, especially at least three, preferably three or four, most preferably three, separate chambers respectively containing the first component A, the second component B, and preferably the abovementioned third component C, of the polyurethane composition.

Particularly preferred is a pack consisting of a package consisting of the above-described first component A, second component B, and third component C. The third component C comprises in particular the abovementioned tin catalyst K and the abovementioned compound T. The tin catalyst K and the compound T are preferably present exclusively in the third component C.

Mixing is typically effected using a hand mixer. When mixing, care must be taken to ensure that the first component A and the second component B are mixed as homogeneously as possible. If the two components are mixed incompletely, local deviations from the advantageous mixing ratio will occur, which can result in a deterioration in the mechanical properties.

On contact of the first component A with the second component B, curing commences through chemical reaction. This involves the reaction with the isocyanate groups of the hydroxyl groups and any other substances present that are reactive toward isocyanate groups. Excess isocyanate groups react predominantly with moisture. As a result of these reactions, the polyurethane composition cures to give a solid material. This process is also referred to as cross-linking.

The invention thus also further provides a cured polyurethane composition obtained from the curing of the polyurethane composition as described in the present document.

The invention thus relates also to a process for producing a floor covering using the polyurethane composition of the invention, the process comprising:

a) mixing of the first component (A) and the second component (B), and also the at least one filler F, the at least one tin catalyst K, and the at least one compound T, b) applying the mixed material to a substrate, c) optionally smoothing the applied mixed material, and d) curing the applied mixed material to obtain a floor covering.

The first component (A), second component (B), filler F, tin catalyst K, and compound T described in step a) are preferably the same as in the embodiments identified above as being preferred. In step a), a mixture of the polyurethane composition according to the invention is particularly preferably formed, especially a polyurethane composition identified above as being particularly preferred.

It is preferable that steps a) to d) take place in this exact chronological order.

It is further advantageous when steps a) to d) are carried out within the temperature range described below with the following molar ratio of all thiol groups in the at least one compound T to all metal atoms in the at least one tin catalyst K (T/K):

1) 28 to 37.5° C., molar ratio (T/K)=10-40, especially 10-30, 12-25, 12-20, 12-18, 14-18, preferably 15-17; and/or 2) 20 bis 28° C., molar ratio (T/K)=3-30, especially 4-25, 4-20, 5-15, 6-12, 7-12, preferably 7-10; and/or 3) 15 to 20° C., molar ratio (T/K)=2.5-25, especially 3-20, 3-15, 3-12, 3-10, 3.5-8, 4-7, 4.5-6, preferably 5-6; and/or 4) 8 to 15° C., molar ratio (T/K)=2.5-20, especially 2.5-15, 2.5-10, 2.5-8, 3-7, 3.5-6, 3.5-5, preferably 3.5-4.5.

Particularly preferably, the molar ratio of all NCO groups in the polyurethane composition to all metal atoms in the at least one tin catalyst K (NCO/K) in numbers 1) to 4) above is in addition:

1) (NCO/K): 500-1500, 800-1300, 1000-1300, 1100-1300, especially 1150-1250, 2) (NCO/K): 200-1200, 300-1000, 400-800, 500-700, especially 550-650, 3) (NCO/K): 200-800, 300-700, 350-600, 400-550, especially 450-550, 4) (NCO/K): 100-800, 125-700, 150-600, 200-500, especially 250-400.

Preference is given to using in step a) an above-described pack consisting of a package consisting of the above-described first component A, second component B, and optional third component C. Particularly preferably, at least one, preferably both, of the molar ratios (T/K) and or (NCO/K) described in 1) to 4) above are adjusted in line with the prevailing temperature.

In a preferred embodiment, the process is used to produce a sports floor, school or hospital floor, commercial floor, floor in the marine sector or an industrial floor.

Preferred substrates to which the polyurethane composition can be applied are selected from the list consisting of screed floors, concrete floors, and cement floors.

Preferably the substrate is an existing floor, preferably a floor pretreated with a polyurethane primer or an epoxy resin primer. This primer preferably has a thickness of 0.1-1 mm, especially 0.3-0.7 mm.

The polyurethane composition can be applied by any standard process, especially coating, pouring, casting or troweling. The base obtained preferably has a thickness of 0.1-10 mm, 0.5-10 mm, especially 1-8 mm, 1.5-6 mm, 1.5-4 mm, more preferably 1.5-3 mm.

The application temperature for the polyurethane composition is preferably 0 to 40° C., 8 to 40° C., preferably 12 to 35° C., more preferably 15 to 30° C., most preferably 18 to 23° C.

The invention relates also to the floor covering, preferably a sports floor, school or hospital floor, commercial floor, floor in the marine sector or industrial floor, obtainable by the process according to the invention. The invention relates also to the use of the polyurethane composition as a floor covering for sports, school, hospital, commercial, marine or industrial floors, most preferably sports, school, hospital, and commercial floors.

The invention further relates to the use of the polyurethane composition according to the invention for producing the floor coverings described above.

The polyurethane composition preferably has the following properties:

pot life, especially measured as described in the experimental section: >10 min to <5 h, especially 25-80 min, 30-60 min, especially 35-45 min;

curing time, especially measured as described in the experimental section: 3.5-1.25 h, 3-1.5 h, especially 2.75-1.75 h.

EXAMPLES

Substances Used:

TABLE 1

| Substances used. | |
| --- | --- |
| P1 | Reaction product of castor oil with ketone resin, OH value of 150-190 mg KOH/g |
| P2 | Polyoxypropylene triol, hydroxyl value: 350-600 mg KOH/g |
| Molecular sieve | Sylosiv ® A3 |
| Talc | Talc (filler) |
| Chalk | Omyacarb ® 5 GU (Omya); ground natural chalk (filler) |
| Baryte | Baryte powder (filler) |
| Plasticizer | Long-chain paraffin |
| HDI | HDI trimer containing 70% trimer and smaller amounts of higher oligomers, total NCO functionality = 3.1, equivalent weight 183 g/mol, NCO content 22.5-23.5% by weight, Desmodur N 3600 (Covestro) |
| GDMP | Thiocure ® 320 (Bruno Bock Thiochemicals); glycol di(3-mercaptopropionate), molecular weight 238.3 g/mol, 2-functional. |
| MWK3 | Thiocure ® 330 (Bruno Bock Thiochemicals); trimethylolpropane tris(3-mercaptopropionate, molecular weight 398.6 g/mol, 3-functional. |
| MWG4 | Thiocure ® 341 (Bruno Bock Thiochemicals); polycaprolactone bis(3-mecaptopropionate), molecular weight 1350 g/mol, 4-functional. |
| DBTL | Dibutyltin dilaurate |
| DOTL | Dioctyltin dilaurate |
| DABCO T120 | Dibutylbis(dodecylthio)stannane, tin catalyst comprising two 1-functional thio compounds, DABCO T120 |
| Fomrez UL 22 | Bis(dodecylthio)dimethylstannane, Fomrez UL 22 |
| Fomrez UL 32 | Bis(dodecylthio)dioctylstannane, Fomrez UL 32 |
| TIB Kat 318 | Dioctyltin dineodecanoate, TIB Kat 318 |
| TIB Kat 320 | Bis[(2-ethyl-1-oxohexyl)oxy]dioctylstannane, TIB Kat 320 |
| Coscat 83 | 35% by weight of Coscat 83 (organobismuth catalyst; Coscat ® 83 (Vertellus Specialties Inc.)) in plasticizer containing 1 molar equivalent of 8-hydroxyquinoline (based on Bi) (2.68 mmol Bi/g) |

TABLE 2

| Polyurethane composition used. | |
| --- | --- |
| Component (A) | % by weight based on the weight of component (A) |
| P1 | 33.5 |
| P2 | 13 |
| Plasticizer | 5 |
| Talc (filler) | 5 |

TABLE 2-continued

| Polyurethane composition used. | |
| --- | --- |
| Chalk (filler) | 29.5 |
| Baryte (filler) | 9 |
| Molecular sieve | 5 |
| Total | 100 |

| Component (B) | % by weight based on the weight of component (B) |
| --- | --- |
| HDI | 100 |
| Total | 100 |

Preparation of Polyurethane Compositions and Measurement Methods

For each composition, the ingredients of the first component A specified in Tables 3-8, in the specified amounts (in parts by weight (wt.-%)), were processed using a vacuum dissolver with the exclusion of moisture into a homogeneous mixture and stored. The ingredients of the second component B specified in the tables were likewise processed and stored. The type and amount of compound T and of tin catalyst K or bismuth catalyst added when mixing the components are listed in Tables 3-8. The molar ratio between free NCO groups and NCO-reactive groups was 1.0.

For determination of the pot life (TZ), the reaction curve for curing at room temperature was determined. For this, components A and B were thermally equilibrated at the temperature and relative humidity specified in Tables 3-8. The components in the appropriate mixing ratio, optionally with the addition of catalyst and thiol compound, are mixed using a precision glass stirrer for 120 seconds at 1000 rpm and then 75 ml thereof is transferred to a 100 ml paper cup. This paper cup is insulated on the outside with heat-insulating material. 4 minutes after the start of mixing, the time measurement begins and the temperature measurement carried out by means of a Testo 176 T4 temperature measurement device with NiCr—Ni thermocouples placed in the middle of the mixed composition.

After the two components have been mixed, the cross-linking reaction commences. This is manifested in the rise in viscosity and increase in temperature. The pot life is the time taken to reach the critical temperature or a significant change in the temperature rise. To determine the reactivity, the rate at which a sample reaches its maximum temperature $T_{max}$ is measured. The temperature curve allows a comparative assessment of reaction resin masses in respect of their reactivity.

The maximum temperature reached (Tmax) and the time taken to reach T=40° C. can be read from the temperature curve. The pot life is determined graphically from the recorded temperature-time plot. The measured values are determined as the perpendicular to the time axis of the points of vertical intersection of the first change in the slope of the temperature-time curve. The position of the intercept on the time axis gives the pot life in minutes.

The time taken to reach T=40° C. (TZ 40° C.) is shown in Tables 3-6 and 8.

For the experiments with the differently functional sulfur compounds in Table 7 and for the compositions E24-E27 in Table 8, the same procedure was used, but until T=50° C. (TZ 50° C.) was reached. Instead of a precision glass stirrer, a SpeedMixer (DAC 150 FV, Hauschild) was used for 120 seconds at 2400 rpm.

In the experiments in Table 7, DABCO T120 was added as catalyst to the composition shown in Table 2. In addition to the 1-functional thiol compounds present in DABCO T120, the listed compounds T (GDMP, MWK3, or MWG4) were added in amounts such that the molar ratio (T/K) indicated in Table 7 was obtained.

In the compositions in Table 8, GDMP was used as compound T and the tin catalysts indicated in Table 8 as tin catalyst K.

To determine the curing rate, the Shore A hardness (Shore A) of a 2 mm film on a hard surface was determined. This hardness test is used to estimate when the degree of hardness increases only negligibly or not at all. Shore A hardness measurements were taken after 1.5 h, 2 h, 3 h, 4 h, 5 h, 6 h, and after 24 h; on reaching a value higher than 75, a film was judged to be sufficiently cured.

Components A and B were thermally equilibrated at the temperature and relative humidity (RH) specified in Tables 3-6 and 8. The components in the appropriate mixing ratio, optionally with the addition of catalyst and thiol compound, are mixed using a SpeedMixer® (DAC 150 FV, Hauschild) for 120 seconds at 2400 rpm. The time measurement begins at the moment mixing starts. Approximately 11 g of the mixed composition was transferred to a round plastic sample mold 7.3 cm in diameter so as to achieve a thickness of 2 mm. This was then placed on a steel plate as substrate. After the specified times, the Shore A hardness measurements were performed as described in DIN EN ISO 868 (October 2003 version) except that a layer thickness of 2 mm was employed.

The results of the measurements are given in Tables 3-6.

In the tables, compositions according to the invention are identified as "E" (E1 to E28) and noninventive reference compositions as "Ref." (Ref. 1 to Ref. 4).

Table 8 shows measurements of cure rates and pot lives of various organotin(IV) compounds.

TABLE 3

|  | t (h) | E1 | E2 | E3 | E4 | E5 | E6 | E7 | E8 |
|---|---|---|---|---|---|---|---|---|---|
| Temperature/RH |  | 12° C./50% | 12° C./50% | 12° C./50% | 12° C./50% | 18° C./50% | 18° C./50% | 18° C./50% | 18° C./50% |
| Proportion of DBTL [g/100 g component A] |  | 0.2 | 0.25 | 0.3 | 0.4 | 0.2 | 0.25 | 0.3 | 0.4 |
| Proportion of GDMP [g/100 g component A] |  | 0.3 | 0.3 | 0.3 | 0.3 | 0.3 | 0.3 | 0.3 | 0.3 |
| Amount by weight of isocyanate component per 100 g comp. A [g] |  | 33.5 | 33.5 | 33.5 | 33.5 | 33.5 | 33.5 | 33.5 | 33.5 |
| NCO/K |  | 579.3 | 463.4 | 386.2 | 289.6 | 579.3 | 463.4 | 386.2 | 289.6 |
| T/K |  | 8.0 | 6.4 | 5.3 | 4.0 | 8.0 | 6.4 | 5.3 | 4.0 |
| TZ 40° C. [min] |  | 118 | 99 | 72 | 40 | 77 | 59 | 45 | 30 |
| Shore A | 1.5 |  |  |  |  |  |  | 58.9 | 72.7 |
|  | 2 |  |  |  | 72.2 |  | 60.2 | 66.3 | 76.7 |
|  | 2.5 |  |  |  | 74.5 |  | 71.8 | 77.2 | 80.2 |
|  | 3 |  |  | 69.5 | 77.7 | 62.3 | 78 |  | 81.3 |
|  | 3.5 |  | 64.6 | 74.1 |  | 75 |  | 79.9 | 82.4 |
|  | 4 |  | 70.7 | 76.6 | 78.5 |  | 78.3 | 80.7 |  |
|  | 5 | 68.2 | 75.7 | 79 | 80.3 |  |  |  |  |
|  | 6 | 76.3 | 77.6 | 80.5 | 82 | 81.3 | 80.4 | 81.9 | 83.2 |
|  | 7 | 79.9 |  |  |  |  |  |  |  |
|  | 24 | 81.9 | 80.3 | 85.1 | 83.1 | 86.9 | 84.6 | 87.3 | 87.2 |

TABLE 4

|  | t (h) | E9 | E10 | E11 | E12 | E13 | E14 | E15 |
|---|---|---|---|---|---|---|---|---|
| Temperature/RH |  | 18° C./50% | 18° C./50% | 18° C./50% | 18° C./50% | 18° C./50% | 18° C./50% | 18° C./50% |
| Proportion of DBTL [g/100 g component A] |  | 0.3 | 0.3 | 0.3 | 0.3 | 0.1 | 0.1 | 0.9 |

TABLE 4-continued

| | t (h) | E9 | E10 | E11 | E12 | E13 | E14 | E15 |
|---|---|---|---|---|---|---|---|---|
| Proportion of GDMP [g/100 g component A] | | 0.6 | 0.2 | 1.2 | 0.13 | 0.1 | 0.08 | 0.9 |
| Amount by weight of isocyanate component per 100 g comp. A [g] | | 34 | 33.5 | 35 | 33.5 | 33.3 | 33.3 | 34.5 |
| NCO/K | | 391.9 | 386.2 | 403.5 | 386.2 | 1151.6 | 1151.6 | 132.6 |
| T/K | | 10.6 | 3.5 | 21.2 | 2.3 | 5.3 | 4.2 | 5.3 |
| TZ 40° C. [min] | | 109 | 25 | 290 | 13 | 56 | 43 | 50 |
| Shore A | 1.5 | | 71.9 | | 75.8 | | | 69.7 |
| | 2 | | 77.1 | | 77.8 | | 40.1 | 76.6 |
| | 2.5 | | 78.4 | | 78.2 | | | 81.5 |
| | 3 | | 79.7 | | 79 | 61.0 st | 63.1 st | |
| | 3.5 | 65.5 st | | | 80.1 | 69.9 st | 71.1 st | 82.3 |
| | 4 | 76.6 | 81.4 | | 80.8 | 75.8 st | 77.2 st | |
| | 5 | 81.3 | 82.2 | | | | | |
| | 6 | | | 72.0 st | | 80.7 vst | 80.3 vst | 84.0 |
| | 7 | 83.3 | 82.6 | | 82.4 | | | |
| | 24 | 86.6 | 85.5 | 83.6 | 83.7 | 85.1 vst | 84.8 vst | 85.6 |

"st" = slightly tacky,
"vst" = very slightly tacky

TABLE 5

| | t (h) | E16 | E17 | E18 | E19 | E20 |
|---|---|---|---|---|---|---|
| Temperature/RH | | 23° C./50% | 23° C./50% | 23° C./50% | 23° C./50% | 35° C./50% |
| Proportion of DBTL [g/100 g component A] | | 0.2 | 0.2 | 0.2 | 0.4 | 0.1 |
| Proportion of GDMP [g/100 g component A] | | 0.3 | 0.4 | 0.5 | 0.8 | 0.3 |
| Amount by weight of isocyanate component per 100 g comp. A [g] | | 33.5 | 33.5 | 33.7 | 34.1 | 33.5 |
| NCO/K | | 579.3 | 579.3 | 582.7 | 294.8 | 1158.6 |
| T/K | | 8.0 | 10.6 | 13.3 | 10.6 | 15.9 |
| TZ 40° C. [min] | | 27 | 39 | 52 | 44 | 32 |
| Shore A | 1.5 | 76.8; t | 73.1; t | | 64.7; t | 78.4 |
| | 2 | 81.1 | 79.5 | 73.8 | 76 | 80.6 |
| | 2.5 | | | | | |
| | 3 | 83.7 | 79.9 | 80.7 | 83.3 | |
| | 3.5 | | | | | |
| | 4 | 84 | 84 | 84.5 | 83.9 | |
| | 5 | | | | | |
| | 6 | | | | | |
| | 7 | | | | | |
| | 24 | | | | | |

"t" = tacky

TABLE 6

| | Ref. 1 | Ref. 2 | Ref. 3 | Ref. 4 |
|---|---|---|---|---|
| Temperature/RH | 23° C./50% | 23° C./50% | 23° C./50% | 23° C./50% |
| Proportion of Coscat 83 [g/100 g component A] | 0.2 | 0.2 | 0.2 | 0.3 |
| Proportion of GDMP [g/100 g component A] | 0.1 | 0.05 | 0.2 | 0.4 |
| Amount by weight of isocyanate component per 100 g comp. A [g] | 33.4 | 33.3 | 33.5 | 33.9 |
| NCO/K | 661.0 | 659.0 | 663.0 | 447.3 |
| T/K | 3.0 | 1.5 | 6.1 | 8.1 |
| TZ 40° C. [min] | 17 | 4 | 44 | 72 |

TABLE 6-continued

| Shore A | t(h) | | | | |
|---|---|---|---|---|---|
| | 1.5 | l/t | l/t | l/t | l/t |
| | 2 | l/t | l/t | l/t | l/t |
| | 2.5 | l/t | l/t | l/t | l/t |
| | 3 | l/t | l/t | l/t | l/t |
| | 3.5 | l/t | l/t | l/t | l/t |
| | 4 | l/t | l/t | l/t | l/t |
| | 5 | l/t | l/t | l/t | l/t |
| | 6 | l/t | l/t | l/t | l/t |
| | 7 | n.d. | n.d. | n.d. | n.d. |
| | 24 | n.d. | n.d. | n.d. | n.d. |

"l/t" = liquid and tacky film on surface, no Shore A determination possible

TABLE 7

| | Compound T | | MW | Functionality | TZ 50° C. [min] | (T/K) | (NCO/K) |
|---|---|---|---|---|---|---|---|
| E21 | GDMP | Thiocure 320 | 238.3 | 2 | 17 | 7.3 | 333.2 |
| E22 | MWK3 | Thiocure 330 | 398.6 | 3 | 18 | 7.3 | 333.2 |
| E23 | MWG4 | Thiocure 341 | 1350 | 4 | 23 | 7.5 | 333.2 | all experiments for TZ 50° C. thermally equilibrated at temperature 23° C./50% humidity

TABLE 8

| | Tin catalyst | MW [g/mol] | Number of sulfur ligands in catalyst | TZ 50° C. [min] | TZ 40° C. [min] | Shore A > 75 23° C./50% [h] | (T/K) | (NCO/K) |
|---|---|---|---|---|---|---|---|---|
| E24 | DABCO T120 | 635.7 | 2 | 17 | | 2 | 7.3 | 333.2 |
| E25 | Fomrez UL 22 | 551.6 | 2 | 25 | | 3 | 8.94 | 333.2 |
| E26 | Fomrez UL 32 | 747.9 | 2 | 28 | | 3 | 8.3 | 392.0 |
| E27 | TIB Kat 320 | 631.6 | 0 | 27 | | 2.5 | 7.95 | 574.2 |
| E16 | DBTL | 631.5 | 0 | | 27 | 1.5 | 8.0 | 579.3 |
| E28 | TIB Kat 318 | 687.7 | 0 | | 36 | 2 | 8.66 | 625.1 | all experiments for TZ 40° C. and TZ 50° C. thermally equilibrated at temperature 23° C./50% humidity

The invention claimed is:

1. A polyurethane composition comprising a first component A and a second component B, wherein the first component A comprises a polyol mixture P, comprising at least one polyol P1 having an average molecular weight of 800 to 30 000 g/mol, wherein the polyol P1 is a polyhydroxy-functional fat and/or a polyhydroxy-functional oil, or a polyol obtained by chemically modifying natural fats and/or natural oils; and at least one polyol P2 selected from the group consisting of polyester polyols and polyether polyols;

wherein a sum total of polyol P1 and polyol P2 is more than 75% by weight of the polyol mixture P; and the second component B comprises at least one aliphatic polyisocyanate I;

wherein the polyurethane composition additionally contains 5% by weight to 70% by weight of at least one filler F, based on the total weight of the polyurethane composition, and at least one tin catalyst K for the reaction of hydroxyl groups and isocyanate groups that is capable of forming thio complexes, and at least one compound T having at least one thiol group, a molar ratio of all thiol groups in the at least one compound T to all metal atoms in the at least one tin catalyst K (T/K) being from 2.2:1 to 40:1 and a molar ratio of all NCO groups in the polyurethane composition to all metal atoms in the at least one tin catalyst K (NCO/K) being from 50 to 1500.

2. The polyurethane composition as claimed in claim 1, wherein the polyol P1 is castor oil or a chemical modification thereof.

3. The polyurethane composition as claimed in claim 1, wherein the polyol P1 is a polyol having an OH value of from 110 to 200 mg KOH/g.

4. The polyurethane composition as claimed in claim 1, wherein the polyol P2 has an OH value within a range of from 20 to 600 mg KOH/g.

5. The polyurethane composition as claimed in claim 1, wherein the polyol P2 is a polyether polyol selected in particular from the list consisting of polyoxyethylene polyol, polyoxypropylene polyol, and polyoxypropylene polyoxyethylene polyol.

6. The polyurethane composition as claimed in claim 1, wherein the weight ratio of polyol P1 to polyol P2 ((P1)/(P2)) is from 1.25 to 2.5.

7. The polyurethane composition as claimed in claim 1, wherein the tin catalyst K is an organotin compound.

8. The polyurethane composition as claimed in claim 1, wherein the tin catalyst K is present only in a third component C that is not the first component A or the second component B.

9. The polyurethane composition as claimed in claim 1, wherein compound T comprises compounds having 1 to 6 thiol groups.

10. The polyurethane composition as claimed in claim 1, wherein the molar ratio (T/K) is 2.5:1 to 30:1.

11. The polyurethane composition as claimed in claim 1, wherein the molar ratio (NCO/K) is 100 to 1300.

12. The polyurethane composition as claimed in claim 1, wherein the polyurethane composition has the following molar ratios (T/K) and (NCO/K):

(T/K): 3.5-6, and (NCO/K): 200-500; or
(T/K): 4-7, and (NCO/K): 350-600; or
(T/K): 7-12, and (NCO/K): 400-800; or
(T/K): 10-40, and (NCO/K): 800-1300.

13. A pack consisting of a package containing the polyurethane composition as claimed in claim 1, having at least two separate chambers respectively containing a first component A or a second component B, as described for the polyurethane composition.

14. A process for producing a floor covering using a polyurethane composition as claimed in claim 1, the process comprising:

a) mixing of the first component (A) and the second component (B), and also the at least one filler F, the at least one tin catalyst K, and the at least one compound T, b) applying the mixed material to a substrate, c) optionally smoothing the applied mixed material, and d) curing the applied mixed material to obtain a floor covering.

15. The process as claimed in claim 14, wherein steps a) to d) are carried out within the temperature range described below with the following molar ratio of all thiol groups in the at least one compound T to all metal atoms in the at least one tin catalyst K (T/K):

1) 28 to 37.5° C., molar ratio (T/K)=10-40; and/or
2) 20 to 28° C., molar ratio (T/K)=3-30; and/or
3) 15 to 20° C., molar ratio (T/K)=2.5-25; and/or
4) 8 to 15° C., molar ratio (T/K)=2.5-20.

16. The process as claimed in claim 15, wherein the molar ratio of all NCO groups in the polyurethane composition to all metal atoms in the at least one tin catalyst K (NCO/K) in numbers 1) to 4) is:

1) (NCO/K): 500-1500,
2) (NCO/K): 200-1200,
3) (NCO/K): 200-800,
4) (NCO/K): 100-800.

17. The process as claimed in claim 14, wherein in step a) a pack consisting of the package containing the polyurethane composition, having at least two separate chambers respectively containing the first component A or the second component B, as described for the polyurethane composition, is used.

18. A method comprising covering a floor with the polyurethane composition as claimed in claim 1.

19. The polyurethane composition as claimed in claim 1, wherein the polyurethane composition contains less than 5% by weight of solvents.

20. The polyurethane composition as claimed in claim 1, wherein the polyol mixture P comprises more than 80% by weight of the total amount of NCO-reactive groups in the polyurethane composition.

* * * * *